United States Patent [19]

Cilia et al.

[11] Patent Number: 5,332,094
[45] Date of Patent: Jul. 26, 1994

[54] HEAT SHRINKABLE HANDLE BAG ARTICLE

[75] Inventors: Philip F. Cilia, Palos Hills; Vytautas Kupcikevicius, Oaklawn, both of Ill.

[73] Assignee: Viskase Corporation, Chicago, Ill.

[21] Appl. No.: 95,465

[22] Filed: Jul. 23, 1993

[51] Int. Cl.⁵ .............................................. B65D 65/00
[52] U.S. Cl. ...................................... 206/497; 383/10
[58] Field of Search .......................... 383/10; 206/497

[56] References Cited

U.S. PATENT DOCUMENTS

| | | | |
|---|---|---|---|
| 3,273,302 | 12/1963 | Walter . | |
| 3,732,661 | 5/1973 | Goldberger et al. | 383/10 X |
| 3,757,937 | 9/1973 | Weinstein . | |
| 4,031,815 | 6/1977 | Verbeke | 383/10 X |
| 4,119,268 | 10/1978 | Segura . | |
| 4,134,245 | 1/1979 | Stella | 383/10 X |
| 4,549,877 | 10/1985 | Lehmacher . | |
| 4,555,025 | 11/1985 | Weinbert et al. . | |
| 4,640,081 | 2/1987 | Kawaguchi . | |
| 5,120,553 | 6/1992 | Kupcikevicius . | |

FOREIGN PATENT DOCUMENTS 2059947 3/1981 United Kingdom .

OTHER PUBLICATIONS

Sample of Handle Bag, No Date.

Primary Examiner—Stephen P. Garbe
Assistant Examiner—Jes F. Pascua
Attorney, Agent, or Firm—Roger Aceto

[57] ABSTRACT

A heat shrinkable bag having a slit cut through two plies of a skirt portion so that the skirt forms a handle upon heat shrinking. The slit is cold cut through both plies of the skirt for most of the slit length except the opposite ends of the slit are burnt through the skirt to weld the plies together at the slit ends.

2 Claims, 4 Drawing Sheets

HEAT SHRINKABLE HANDLE BAG ARTICLE

TECHNICAL FIELD

The present invention relates to a method and apparatus for forming shrinkable bags as used in the vacuum packaging of bulky food articles such as whole muscle meat products, brick cheese, and poultry such as whole turkeys and the like wherein the bag has an integral handle forming portion at the bottom or "preclosed" end of the bag. More particularly, the present invention relates to such a method and apparatus which provides an improved handle structure and to a bag wherein the integral handle formed on heat shrinking has enhanced appearance and strength characteristics.

BACKGROUND OF THE INVENTION

It is customary in food packaging to vacuum package bulky food items in heat shrinkable bags. After evacuation and sealing, the bag sometimes referred to as a "shrink bag", is immersed in hot water or otherwise exposed to heat which causes the bag to shrink tightly about the food item to create a relatively wrinkle-free package. Fresh and frozen turkeys and the like are commonly packaged in this fashion for retail sale.

Since the resulting package is relatively bulky and heavy, a handle to facilitate lifting and carrying the package is desirable. A shrink bag having a handle portion at the preclosed end of the bag is disclosed in U.S. Pat. No. 5,120,553. This bag has a skirt of heat shrinkable material at the preclosed end of the bag. The skirt is composed of a part of each of two superimposed bag panels so it is two plies thick. There is a slit cut in the skirt. On heat shrinking about a product sealed in the bag, the skirt shrinks and thickens to provide a handle for carrying the resulting package wherein the slit forms the handle opening. The easiest and most conventional way of making the slit is to use a hot wire to burn through both plies of the skirt material. The hot wire melts the plies so they weld together at the edge of the slit. The result is that the slit edge is a fused bead formed from both skirt plies.

The fused bead produced by the hot wire burning through the plies also acts as a seal to prevent entry of liquids or contaminants into the area between the plies. However, one drawback of using a hot wire to form the slit is that the resulting fused bead at the slit edge detracts from the handle appearance on subsequent heat shrinking. In this respect, when the bag material undergoes heat shrinking the fused bead at the slit edge shrinks much less than the surrounding plies. As a result, the shrinkage of the surrounding plies draws the fused bead together lengthwise so it assumes a crinkled appearance. Since the fused bead becomes an edge of the bag handle, the effect is that the handle is crinkled along its edges which detracts from the appearance of the handle.

The crinkled appearance of the edge of the bag handle can be avoided by cutting the slit with a cold knife. With a cold cut slit, the plies at the slit edge are not fused together so no bead is formed. Without a fused bead, the heat shrinking is uniform along the length of the slit so the resulting handle has smoother, more attractive side edges.

However, there are drawbacks to cutting the slit with a cold knife. For example, with a cold knife the slit edge may have nicks along the slit edge. These nicks represent stress concentrations which can compromise the strength of the handle. This is because if a nick is put into tension, as may occur when the handle is used for lifting, a tear will initiate at the nick and propagate through the handle causing it to fail. Nicks in the skirt material around the ends of the slit are a particular problem since these areas are most likely to be subjected to tensile forces. It is conventional to curve the ends of the slit to increase handle strength. However, with all things being equal, it has been found that handles formed using a cold knife to cut the slit, are much weaker than if a hot wire is used to form the slit. Also, with a cold cut slit the plies of film forming the handle are not welded together. This allows free passage and entry of liquids and contaminants into the space between the plies.

SUMMARY OF THE INVENTION

A shrink bag according to the present invention is of the type generally described in U.S. Pat. No. 5,120,553, the description of which is incorporated herein by reference. As shown in the '553 Patent, the bag has front and rear panels composed of a heat shrinkable thermoplastic film commonly used for shrink bag packaging. The bag has an open end for loading product into the bag. The opposite end is the preclosed end of the bag. There is a skirt along this preclosed end formed of the portions of the front and rear panels which extend beyond the preclosed end. The skirt which is formed by superimposed portions of the front and rear panels, is two plies thick.

The skirt has a transverse slit through both plies which forms the handle opening. Upon the heat shrinking of the bag about a product loaded and vacuum sealed in the bag, the skirt material around the slit, which forms the handle, shrinks and thickens.

In a method and apparatus according to the present invention both a cold knife and a hot wire are used to form portions of the slit. For aesthetic purposes, the major portion of slit length is cut with a cold knife. The cold knife does not cause the plies to weld together along the margins of the slit. Accordingly, these slit margins are free, one from another, so on heat shrinking, the slit margins undergo a free shrink to provide a smooth edge to the handle.

As noted above, a cold cut slit compromises the strength of the handle. Accordingly, to increase handle strength, the opposite ends of the slit are formed using a hot wire which burns through both plies and welds the plies together. The smooth fused bead formed by the hot wire enhances the tear resistance at the slit ends. While a fused bead detracts from the appearance of a portion of the subsequently formed handle, this sacrifice in appearance is offset by a gain in the handle strength over a comparable handle formed solely by a cold cut slit. Accordingly, aesthetic appearance at only the slit ends is sacrificed for improved handle strength. The result is a handle having an overall enhanced appearance while retaining the strength of a comparable handle formed using a hot wire to cut the entire slit.

Since a portion of the slit is cut with a cold knife, the plies along this portion of the slit are not welded together so there is an opening which allows passage of liquids or other contaminants into the skirt between the handle plies. To prevent this, the plies are fused together a short distance from the slit by heat sealing. The heat seal extends around the entire slit and cuts off the passage into the skirt yet still allows free shrinkage of the skirt material along the edge of the cold cut portion of the slit.

The entire slit can be formed in a single operation using a die having independently movable components to clamp the bag to an anvil, burn through and fuse the bag plies to form the opposite ends of the slit, cut the bag plies with a cold knife to connect the opposite fused ends of the slit, and then heat sealing to form a seal which circumscribes the slit.

Accordingly, as noted above, a bag of the present invention is a heat shrinkable bag composed of generally rectangular front and rear panels of a thermoplastic, heat shrinkable material joined with a transverse heat seal that forms the preclosed bottom end of the bag. Portions of the panels extend from this heat seal to form a skirt along the bag bottom. The skirt has a slit which extends across the longitudinal midline of the bag wherein the opposite ends of the slit are arcuate and curve inwards towards the preclosed end.

In one aspect, the present invention is characterized by such a bag having a major portion of the slit cold cut through both panels so the panels are loose and free one from another along this portion. A minor portion of the slit length comprising arcuate end sections are burned through both panels so the panels are welded together at the slit ends. In addition, a second heat seal which circumscribes the entire slit may join the two panels.

DETAILED DESCRIPTION

Figure 1:
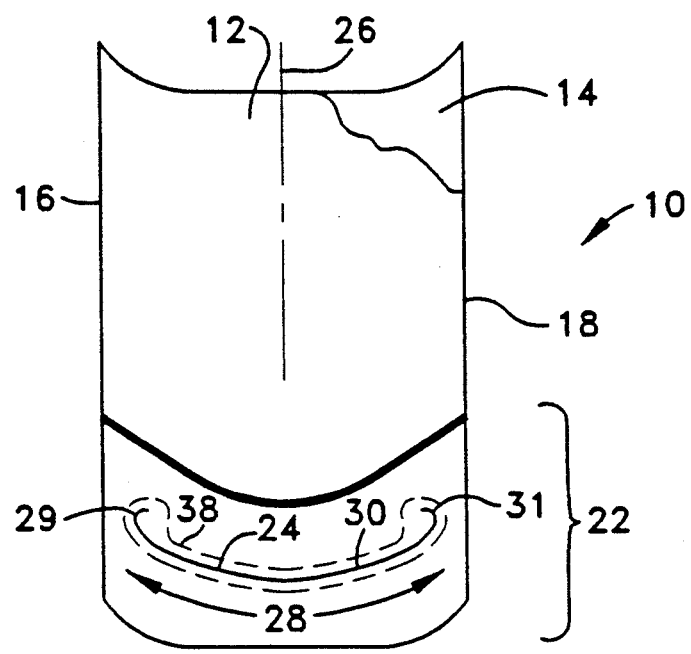
FIG. 1 is a plan view of a bag according to the present invention unfilled and prior to heat shrinking.

Referring to the drawings, FIG. 1 shows a heat shrinkable bag of the present invention generally indicated at 10 in its lay-flat condition. The bag is made of a suitable heat shrinkable thermoplastic packaging film commonly used for vacuum packaging food products. A suitable film is an oriented heat shrinkable film as disclosed for example in U.S. Pat. No. 4,863,769.

Generally, such films are formed as blown tubes. The tube is collapsed to a lay-flat condition to provide superimposed front and rear panels having seamless side edges. The laid-flat tube then is heat sealed across its width to form the preclosed bottom end of the bag.

In accordance with this practice, FIG. 1 shows the bag 10 to comprise superimposed front and rear panels 12, 14 respectively which lay flat one against the other. The side edges 16, 18 are seamless and a heat seal 20, extending across the bag, joins the panels to form the preclosed bottom end of the bag. A portion of each panel extending from this heat seal forms a skirt 22, two plies thick, along the preclosed bottom end of the bag. The material of this skirt provides a handle upon the heat shrinking of the bag about a food product vacuum packaged within the bag.

To form the bag handle, the skirt is provided with a slit opening 24 in accordance with the present invention which extends transverse the longitudinal midline 26 of the bag. This slit becomes the handle opening and the portion of the skirt surrounding the slit, as indicated at 28, becomes the handle per se in the general shape of a strap which is gripped for carrying the bag including the vacuum packaged food article. The slit has a generally rectilinear portion 30 which comprises the major portion of the slit length. However, segments 29, 31 which define the opposite end portions of the slit are arcuate and curve inwards towards the heat seal 20 and the midline 26. Curving the slit end portions in this fashion is conventional and improves the strength of the handle subsequently formed on heat shrinking. This is because the slit ends are points of stress concentration so that subjecting the slit end to a tensile force could initiate a tear. Curving the slit end portions 29, 31 as shown, positions the opposite ends of the slit in regions which are less likely to be subjected to tensile forces.

Figure 2:
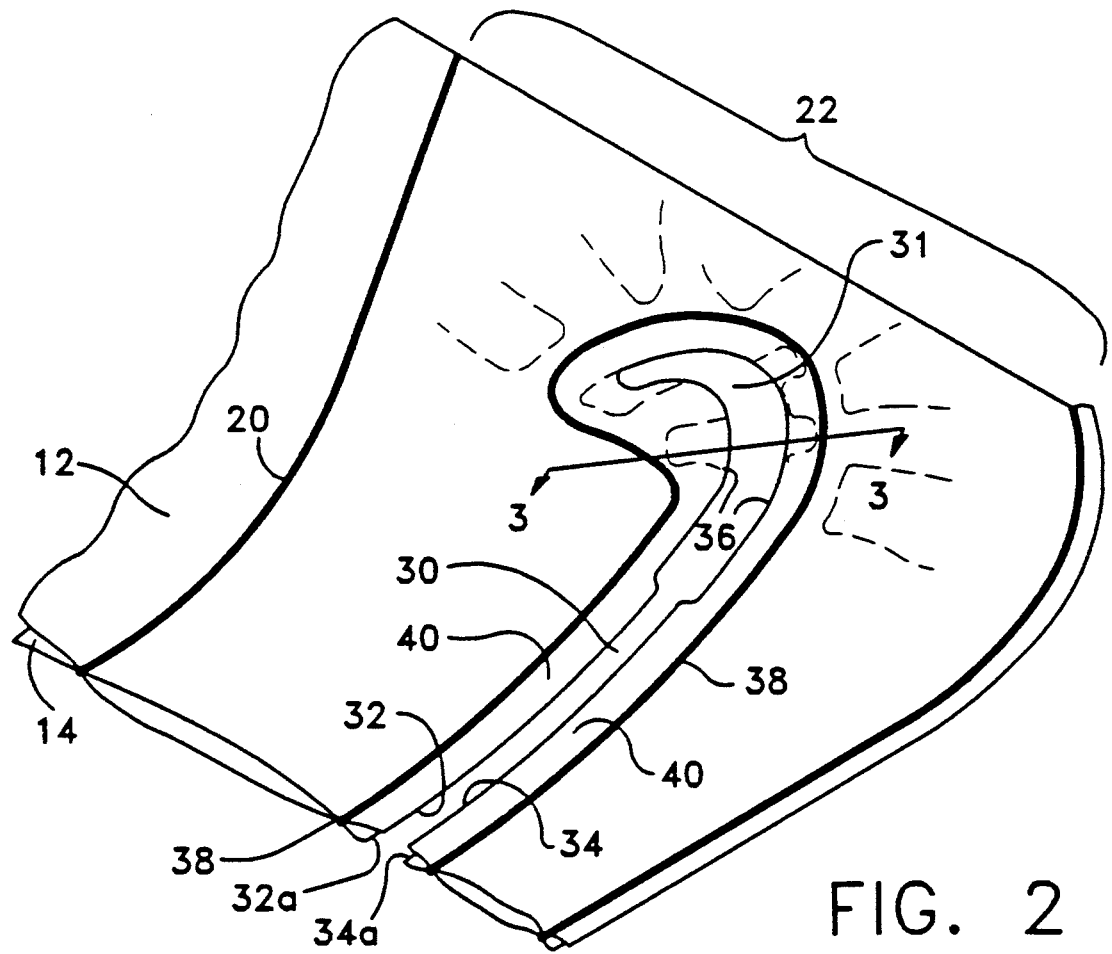
FIG. 2 is a perspective view, on an enlarged scale showing a portion of the bag of FIG. 1.

A portion of the shrink bag 10, including the slit 24 of FIG. 1 is shown on a larger scale in FIG. 2. The slit is symmetrical about the longitudinal midline 26 of the bag (FIG. 1) so it will be sufficient to describe in detail only a portion of the slit on one side of the midline.

The slit, except for segments 29, 31 which define the opposite end portions of the slit, is cold cut. In this respect, a knife which cuts the slit through both plies 12, 14 of the skirt 22 does not weld the plies together. Therefore, slit edges 32, 34 in front panel 12 are not joined to slit edges 32a, 34a in rear panel 14. In contrast, the slit arcuate end segments 29, 31 are each formed by burning through both plies 12, 14 with a hot wire. Using a hot wire causes the plastic film to melt back so the plies 12, 14 weld together and form a relatively smooth fused bead 36 which defines the edge of each arcuate segment 29, 31. Further, as the plastic film melts, it draws back from the hot wire used to form the arcuate segments so the slit at these end portions is wider than where the cold knife is used to cut the slit.

As noted above, the upper and lower panels are not sealed at slit edges 32, 32a and 34, 34a so liquids and contaminants can possibly enter between the panels and accumulate in the skirt. To prevent this, panels 12, 14 are heat sealed together about the perimeter of the entire slit. This forms a seal 38 which circumscribes the slit 24 and is spaced about 5 mm from the slit. In the region of the rectilinear portion 30 of the slit, which is cut with a cold knife, the heat sealing in this manner defines a margin 40 of skirt material between the edge of the cold cut slit 30 and the seal 38. Along this margin the panels 12, 14 are loose and unsealed one from another.

In contrast, the portion of the panels defining a margin 42 around the curved end segments 29, 31 of the slit are heat sealed together as described hereinabove by the action of forming these segments with a hot wire. This is best seen with reference to FIG. 3. This shows the slit curved end segment wherein the panels 12, 14 at the margin 42 are joined by the fused bead along the slit edge 36 and also are joined by the seal 38.

The apparatus for forming the slit, as shown in FIGS. 6-9, is a three part die including an anvil 50, a heat sealer 52 and a knife 54. The heat sealer and knife are independently movable against the anvil as described hereinbelow.

Anvil 50 is conventional and includes a metal base 56 covered with a resilient insulative pad 58. For example, a suitable material for pad 58 would be silicone rubber.

The heat sealer 52 includes a pressure plate 60 mounted for vertical movement towards and away from the anvil 50. This plate is pressed against the anvil pad 58 for clamping the laid flat bag 10 therebetween during the slit forming operation. The pressure plate 60 has a slot 62 which permits passage of the knife 54 as further described hereinbelow.

Figure 7:
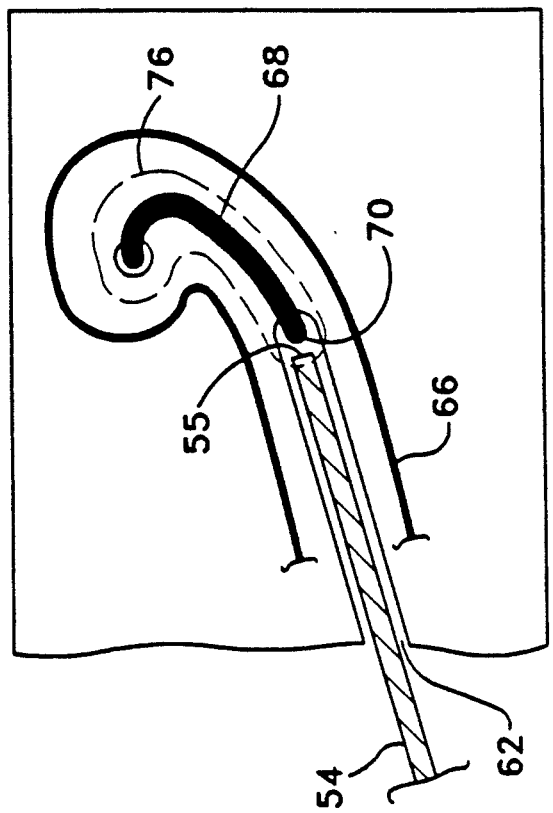
FIG. 7 is a bottom plan view of a portion of the apparatus of FIG. 6 on a larger scale.

The pressure plate, on its lower face 64 carries the electrically heated wires for burning both the curved ends segments 29, 31 of the slit and for forming the seal 38 which circumscribes the slit. In this respect, and as best seen in FIG. 7, a first wire 66 in the shape of the seal 38, is laid against the lower face 64 of the pressure plate and about the slit 62. The ends 65, 67 of this first wire are connected to leads 69, 71 respectively which extend up through the pressure plate for connection to a power source, not shown. A second wire 68, in the shape of the desired curved end segment 29, 31 of the slit, likewise is laid against the pressure plate lower face 64 at each end of the slot 62.

Figure 8:
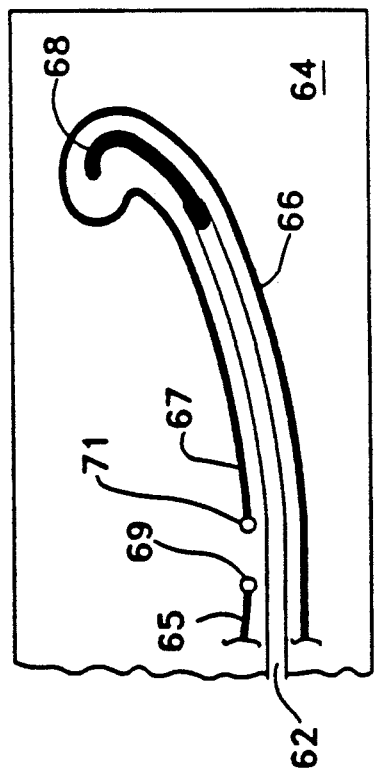
FIG. 8 is an elevation view, partly broken away and in section showing an end portion of the FIG. 6 apparatus on a larger scale.

The second wire 68 sometimes is referred to hereafter as a "hot knife" in that it burns through both plies of the skirt to form the curved segments 29, 31 rather than just heat sealing the skirt plies together. As shown in FIG. 8 the hot knife 68 has one end 70 which extends into the slot 62 and then upwards through the slot. The other end 72 of the hot knife 68 extends up through the pressure plate 60 wherein both ends 70, 72 are connected to a power source. It should be understood that suitable electrical insulation is provided between the wires 66, 68 and the pressure plate 60 although such insulation is not specifically shown. Also not shown is a strip of TEFLON ® coated glass fabric tape which is disposed over both wires 66, 68 to prevent the bag material from sticking to the wire during the heat sealing and burn through operations.

Figure 9:
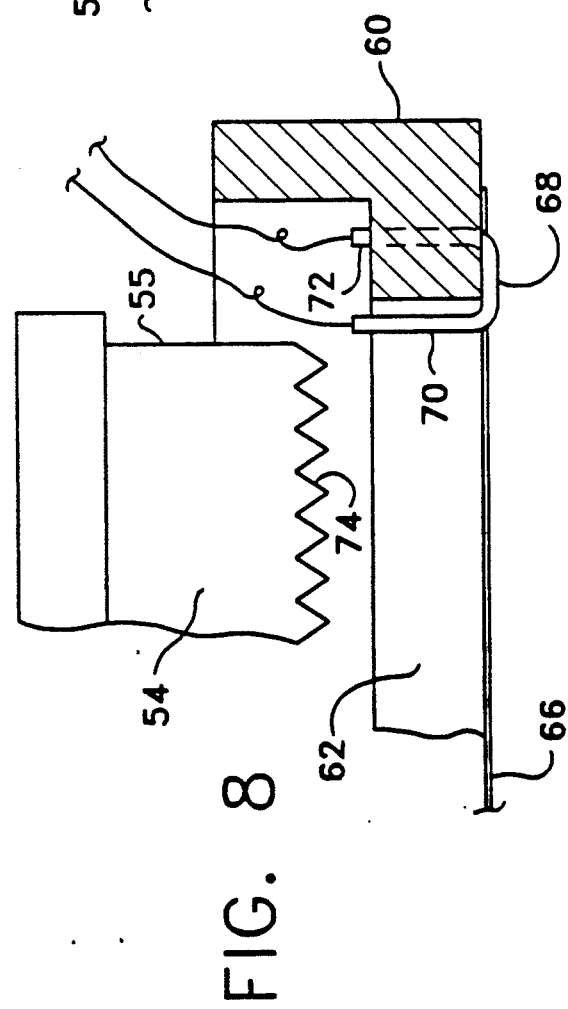
FIG. 9 is a bottom plan view of FIG. 8.

Turning again to FIG. 6, the cold knife 54 is arranged for movement through slot 62 in the pressure plate and against the pad 58 on the anvil. The cutting edge 74 of the knife preferably is serrated as this facilitates puncturing and cutting through film plies clamped between the pressure plate and the anvil. Also, the knife, when it enters the slot, does not contact the second hot wire 68 and is spaced from the end 70 of this hot wire which extends up through the slot (FIGS. 8 and 9).

Figure 6:
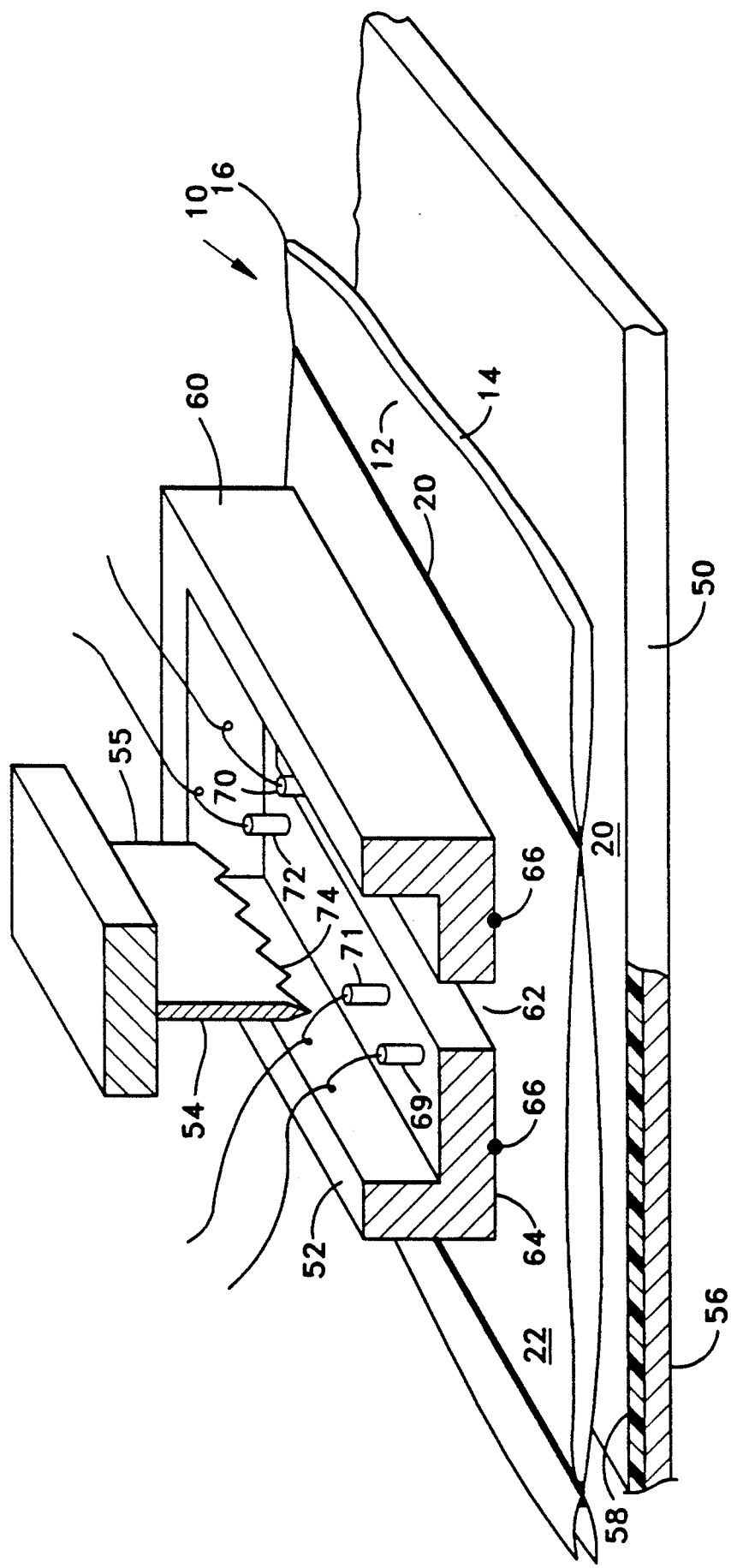
FIG. 6 is a perspective view, partly broken away and in section showing the slit forming apparatus of the present invention.

In operation, the skirt portion 22 of a shrink bag is laid flat on the surface 59 of the anvil pad 58 as shown in FIG. 6. Next the pressure plate 60 is lowered and closed against the anvil to clamp the skirt to the pad 58.

Figure 3:
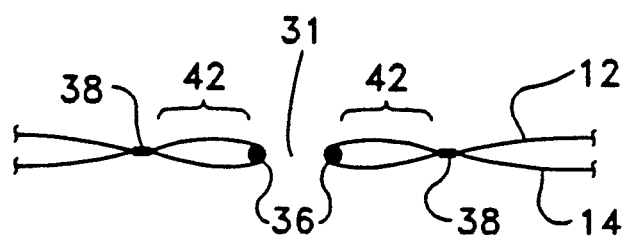
FIG. 3 is a view taken along lines 3—3 of FIG. 2.

After closing, or concurrently with closing, the hot wires 66, 68 are energized. Hot wire 66 fuses the panels 12, 14 of the skirt together to form the seal 38 (FIGS. 1-3). Hot wire 68 which functions as a hot knife burns through both panels to create the curved segments 29, 31 of the slit end. Burning through the film not only welds the panels together but also causes a melt back of the film material from the hot wire 68. The extent of this melt back is represented by dotted line 76 in FIG. 9. As shown in FIG. 9, this melt back extends well into slot 62. Now, when the cold knife 54 is extended into the slot, it will cut the slit portion 30 and connect the burned through slit segment 29, 31 to form the complete slit 24. The sequence of operation of knife 54 and hot knife 68 is not critical in that the cold cut portion 30 of the slit and the curved end segment 29, 31 can be formed simultaneously or one after another. In either case, the end 55 of the cold knife will overlap part of the burned through segment. Also, instead of closing the cold knife 54 against the anvil pad surface 59, the anvil 50 can be provided with a slot (not shown) directly beneath the cold knife. With this arrangement the serrated knife edge 74 can pass into this slot as the cold knife moves against the anvil.

In use, a food product such as a turkey is put into the bag. The bag is evacuated and sealed. Then the bag is heated, such as by immersion in hot water, to shrink the bag about the bird (or other product) contained within the bag.

Figure 4:
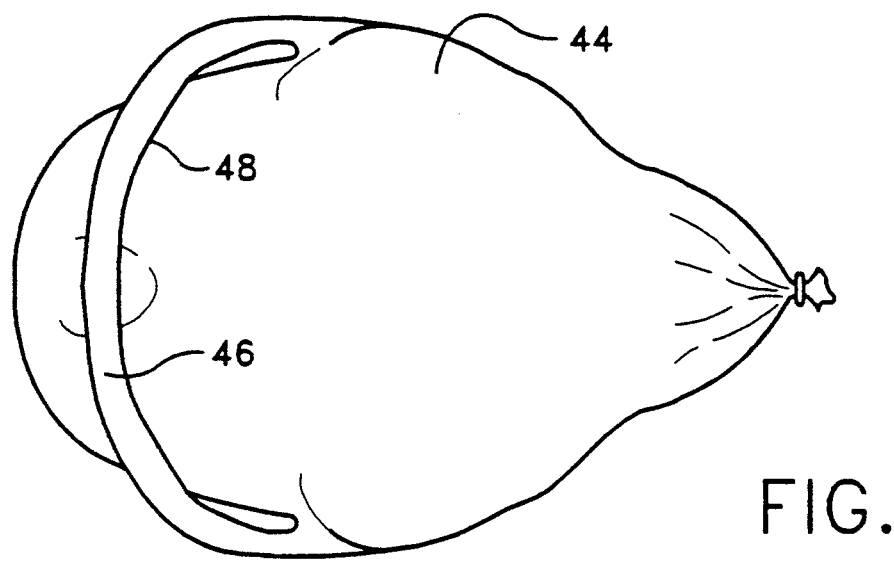
FIG. 4 is a plan view showing a package including the bag of FIG. 1 after heat shrinking.

On heat shrinking, the bag material becomes tight to the bird to provide a smooth generally wrinkle-free package 44 as shown in FIG. 4. Also, on heat shrinking the portion of skirt material indicated at 28 in FIG. 1 shrinks biaxially and thickens to provide a strap-like handle 46 for carrying the package.

The edge 48 of this handle strap includes the cold cut slit edge 34, 34a and the portion of seal 38 adjacent this edge.

Figure 5:
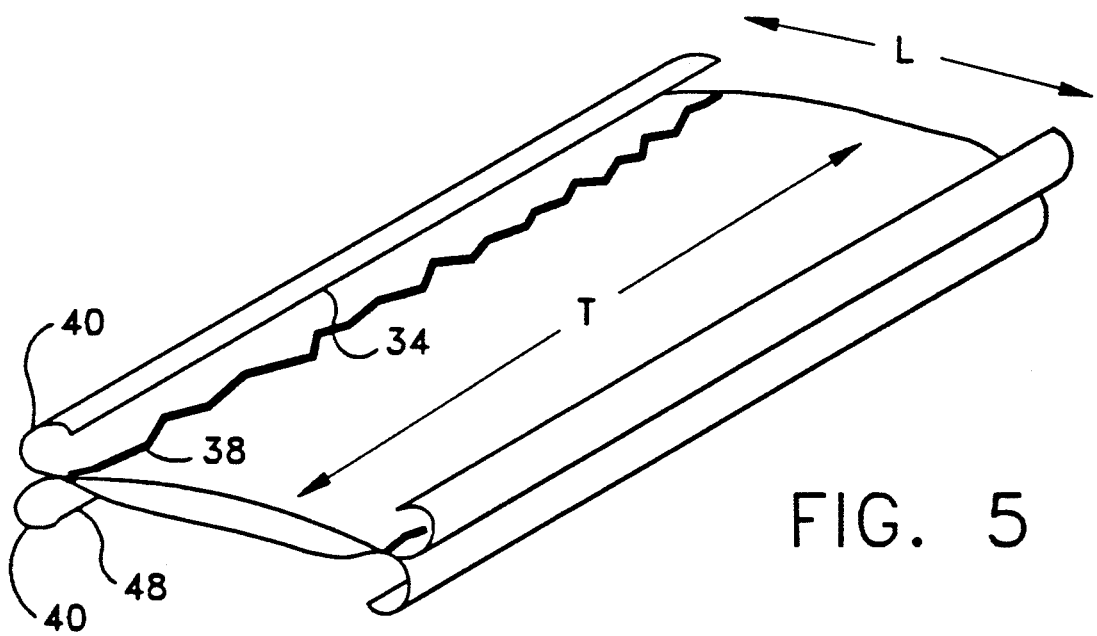
FIG. 5 is a perspective view on an enlarged scale showing a portion of the handle of the bag of FIG. 4.

It should be appreciated that due to its fused state, the seal 38 undergoes little, if any, shrink during the heat shrinking process described above. The result as best seen in FIG. 5 is that the shrinking of the skirt material 28 in the transverse direction "T" draws the seal in together lengthwise so it becomes crinkled in appearance. This is similar to what occurs in prior art bags wherein the entire slit is formed using a hot knife.

However, in the present invention the loose margin 40 of the skirt material, is not heat sealed and is free to shrink in the longitudinal direction "L". As it shrinks in the longitudinal direction, it tends to curl back over the seal 38 as shown in FIG. 5. This at least partly masks the crinkled appearance of the seal 38. As a result, the curled back margins 40 present the strap handle edge 48 with a relatively smooth appearance.

A comparative test was made to determine the relative strength and appearance of handles made using various slit forming techniques. For purposes of the test, thirty (30) identical heat shrinkable bags were divided into three groups of ten bags each.

Group I, considered as the control, consisted of bags made according to the prior art wherein the entire handle forming slit including the rectilinear part and curved end segments as shown in FIG. 1 was formed using a single hot wire to burn through the skirt material. This welded the front and rear bag panels together along the entire slit so there was no need to provide a seal 38 around the slit as shown in FIG. 1.

For Group II bags, the slit was formed in accordance with the present invention using the apparatus as shown in FIGS. 6-9.

For Group III, the apparatus was modified so the entire slit was cut with a serrated knife. For this purpose a modified pressure plate was used which had no hot knife 68. Instead, the slot 62 was extended and curved at its ends. This slot accommodated a serrated knife which was curved at its ends to cold cut the entire slit including the curved ends 29, 31. The pressure plate retained hot wire 66 so the Group III bags retained the seal 38 which circumscribed the slit.

For purposes of testing, a shrink frame is placed in each bag. The frame is more particularly described in U.S. Pat. No. 3,900,635. Briefly, this frame is flat with a rounded end to simulate the curvature of the breast end of a turkey or the like. After the frame is placed in the bag, the bag is pulled tight around the frame and closed. The bag is then immersed in 90°-95° C. water for about five seconds. The shrinkage in this time tightens the bag about the frame and forms the bag handle strap from the skirt portion of the bag.

After shrinking, a pull tester is attached to the middle of the handle strap. The frame is held while the pull tester draws the handle strap longitudinally from the bag at a controlled rate until the handle breaks. The pull force required to break the handle is recorded. The results of these tests are shown in Table I below.

TABLE I

| | Handle Strength Pull Test | | |
|---|---|---|---|
| | Kg. to Failure, Average | Standard Deviation | % of Goal |
| Group I (goal) | 33.7 | 3.2 | 100 |
| Group II (invention) | 34.06 | 4.1 | 101 |
| Group III (cold cut) | 24.64 | 3.2 | 71.4 |

On visual inspection, the handle of Group III had the smoother appearing edge because the margin of film along the slit edge was curled back over the seal 38 which circumscribed the slit. This masked the crinkled appearance of the seal itself.

However, the handles of the Group III failed under a smaller load than those of the control Group I. The slit formed with the serrated knife had nicks along its edge. As noted above, these nicks, particularly along the curved end portions of the slit represent stress concentrations where tearing initiates, which in turn results in failure of the handle. Accordingly the handles of the Group III bags were not as strong as those of the control Group I wherein the slits, formed entirely by burning through the skirt material had no nicks.

Cold cutting the slit with a smooth blade could avoid or minimize the nicks and increase the handle strength. However, a smooth blade is not preferred for commercial applications because it requires an accurate alignment of the knife edge with respect to the anvil in order to insure cutting through the film material for the entire slit length. Such an alignment is not as critical if the knife edge is serrated.

The handles of the Group II bags, on visual inspection, also had a better appearance than those of the Group I controls. This is because for most of the slit length (except for the curved end portions), the margin of film along the slit edge is free to curl back over the heat seal 38 on heat shrinking. Also, the Group II bags exhibited a handle strength comparable to the control. This is attributed to the curved slit ends being formed with a hot knife that produces a smooth edge along the curved portions of the slit as it burns through the skirt plies. As noted above, a smooth edge along this critical portion of the slit avoids development of stress concentrations where tears originate.

Thus, bags having handles according to the present invention had an appearance comparable to a slit cut entirely with a cold knife combined with the strength comparable to a slit formed entirely with a hot knife.

Having described the invention in detail, what is claimed as needed is:

1. A heat shrinkable bag with an integral handle forming portion comprising:
   a) generally rectangular front and rear bag panels of a thermoplastic, heat shrinkable film superimposed and laying flat one against the other, said panels being generally symmetrical about a longitudinal midline;
   b) a transverse heat seal joining said panels, said heat seal defining the closed bottom of said bag;
   c) each of said superimposed panels extending from said heat seal to provide a skirt along said closed bottom which is two plies thick over its entire extent;
   d) said skirt having a slit which extends transverse said longitudinal midline, the opposite ends of said slit being arcuate and curved inwards towards said heat seal;
   e) said slit being cold cut through both of said plies for a major portion of the slit length such that said panels along said major portion are loose and unsealed one from another;
   f) said arcuate slit ends each being hot cut through both of said panels such that said panels along said arcuate ends are fused one to another; and
   g) said skirt upon the heat shrinking of the bag about a product sealed therein being biaxially shrinkable to form a bag carrying handle wherein said slit forms a hand opening for said carrying handle and a portion of said panels along said cold cut length shrinking and curling back over said plies to form a relatively smooth appearing handle edge.

2. A bag as in claim 1 including a second heat seal joining said two panels and circumscribing said slit.

* * * * *